United States Patent
Park et al.

(10) Patent No.: US 9,298,971 B2
(45) Date of Patent: Mar. 29, 2016

(54) METHOD AND APPARATUS FOR PROCESSING INFORMATION OF IMAGE INCLUDING A FACE

(71) Applicant: Samsung Electronics Co. Ltd., Suwon-si, Gyeonggi-do (KR)

(72) Inventors: Mijung Park, Hwaseong-si (KR); Jiyoung Kang, Suwon-si (KR); Chihoon Lee, Seoul (KR); Saegee Oh, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 13/718,390

(22) Filed: Dec. 18, 2012

(65) Prior Publication Data

US 2013/0223695 A1      Aug. 29, 2013

(30) Foreign Application Priority Data

Feb. 23, 2012 (KR) .................. 10-2012-0018636

(51) Int. Cl.
*G06K 9/00* (2006.01)
*H04N 5/222* (2006.01)
*H04N 7/14* (2006.01)

(52) U.S. Cl.
CPC ........ *G06K 9/00228* (2013.01); *G06K 9/00308* (2013.01); *H04N 7/147* (2013.01)

(58) Field of Classification Search
CPC ........... H04N 5/262; H04N 7/18; H04N 5/76; H04N 7/12; H04N 5/232; H04N 5/23293; G06K 9/00221; G06K 9/20; G06K 9/46; G06T 15/20; G06T 5/00

USPC .................. 382/115, 118; 348/222.1, 333.01, 348/333.02
See application file for complete search history.

(56) References Cited

U.S. PATENT DOCUMENTS

| | | | | |
|---|---|---|---|---|
| 4,975,960 A | * | 12/1990 | Petajan | ........................ 704/251 |
| 6,707,484 B1 | * | 3/2004 | Kawasaki et al. | .......... 348/14.01 |
| 7,797,261 B2 | * | 9/2010 | Yang | ................................ 706/45 |
| 8,411,160 B2 | * | 4/2013 | Iwamoto | .................... 348/222.1 |
| 8,681,235 B2 | * | 3/2014 | Choi | .......................... 348/220.1 |
| 8,750,678 B2 | * | 6/2014 | Li et al. | ........................ 386/241 |
| 8,792,685 B2 | * | 7/2014 | Sangster | ...................... 382/118 |
| 2003/0007071 A1 | | 1/2003 | Goto | |
| 2005/0273331 A1 | * | 12/2005 | Lu | ................................ 704/246 |
| 2007/0009028 A1 | | 1/2007 | Lee et al. | |
| 2007/0190513 A1 | * | 8/2007 | Ito | ................................ 434/350 |
| 2007/0220044 A1 | * | 9/2007 | Marugame | ................ 707/103 Y |
| 2008/0218603 A1 | | 9/2008 | Oishi | |
| 2009/0110245 A1 | * | 4/2009 | Thorn | .......................... 382/118 |
| 2009/0175510 A1 | * | 7/2009 | Grim et al. | .................... 382/118 |

(Continued)

FOREIGN PATENT DOCUMENTS

| | | |
|---|---|---|
| EP | 1 347 646 A2 | 9/2003 |
| KR | 10-2002-0015642 A | 2/2002 |

(Continued)

*Primary Examiner* — Sheela C Chawan
(74) *Attorney, Agent, or Firm* — Jefferson IP Law, LLP

(57) ABSTRACT

A method of processing an image is provided. The method includes obtaining an image including a face, obtaining information about whether a preset condition is satisfied after the image is obtained, obtaining location information of a face part in the image when the preset condition is satisfied, and obtaining a synthesis image by adding an image corresponding to the satisfied condition at a location of the face part to the image.

19 Claims, 6 Drawing Sheets

(56) References Cited

U.S. PATENT DOCUMENTS

2009/0251557 A1* 10/2009 Kim et al. ............... 348/222.1
2011/0122219 A1   5/2011 Kim et al.
2011/0227923 A1   9/2011 Mariani et al.

FOREIGN PATENT DOCUMENTS

| KR | 10-2008-0057030 A | 6/2008 |
|---|---|---|
| KR | 10-2008-0110324 A | 12/2008 |
| KR | 100886489 B1 | 2/2009 |

* cited by examiner

METHOD AND APPARATUS FOR PROCESSING INFORMATION OF IMAGE INCLUDING A FACE

PRIORITY

This application claims the benefit under 35 U.S.C. §119(a) of a Korean patent application filed on Feb. 23, 2012 in the Korean Intellectual Property Office and assigned Serial No. 10-2012-0018636, the entire disclosure of which is hereby incorporated by reference.

BACKGROUND OF THE INVENTION

1. Field of the Invention

The present invention relates to a method and an apparatus for processing an image. More particularly, the present invention relates to a method and an apparatus for processing an image including a face.

2. Description of the Related Art

In the past, a high cost apparatus was required for recording and transmitting a visual image, and therefore a video call was not economically feasible as a general communication method. However, due to recent advancement in image processing technology, performing a video call or recording an image through a portable terminal is common. For example, most mobile telephones now include at least one camera function. In the image processing technology, a technology for photographing a person's face or processing an image obtained by photographing the person's face has attracted more interest. Generally, when the video call is performed, the face of one caller is photographed to be sent to the other caller. When such a video call is provided, a method of synthesizing a specific image or an animation (moving image) with a call image is known. According a related-art method, when a user manually selects a menu item for displaying an image (for example, a moving image, i.e., the animation), the portable terminal synthesizes an image corresponding to the selected menu item with the call image to be provided and/or transmitted. However, according to this method, there is a problem in that the user needs to manually select an image during the video call, and thus loses a flow of conversation. Also, there is a problem in that the synthesized image is not harmonized with a face within the image, because an image synthesis is performed at a predefined location or performed at a certain location at a certain size without considering a location or a size of the face displayed within the image.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for image processing capable of synthesizing an image in harmony with a face within the image and providing the synthesized image.

Another aspect of the present invention is to provide a method and an apparatus for image processing capable of synthesizing an image with an appropriate image without losing a flow of conversation and providing the synthesized image.

In accordance with an aspect of the present invention, a method of processing an image is provided. The method includes obtaining an image including a face, obtaining information about whether a preset condition is satisfied after the image is obtained, obtaining location information of a face part in the image when the preset condition is satisfied, and obtaining a synthesis image by adding an image corresponding to the satisfied condition at a location of the face part to the image.

In accordance with another aspect of the present invention, an apparatus for processing an image is provided. The apparatus includes a controller configured to obtain an image including a face, configured to obtain information of whether a preset condition is satisfied after the image is obtained, configured to obtain location information of a face part in the image when the preset condition is satisfied, and configured to obtain a synthesis image by adding an image corresponding to the satisfied condition at a location of the face part to the image.

In accordance with another aspect of the present invention, a storage medium including execution codes readable by a computer to implement an image processing method is provided. The image processing method includes obtaining an image including a face, obtaining information about whether a preset condition is satisfied after the image is obtained, obtaining location information of a face part in the image when the preset condition is satisfied, and obtaining a synthesis image by adding an image corresponding to the satisfied condition at a location of the face part to the image.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
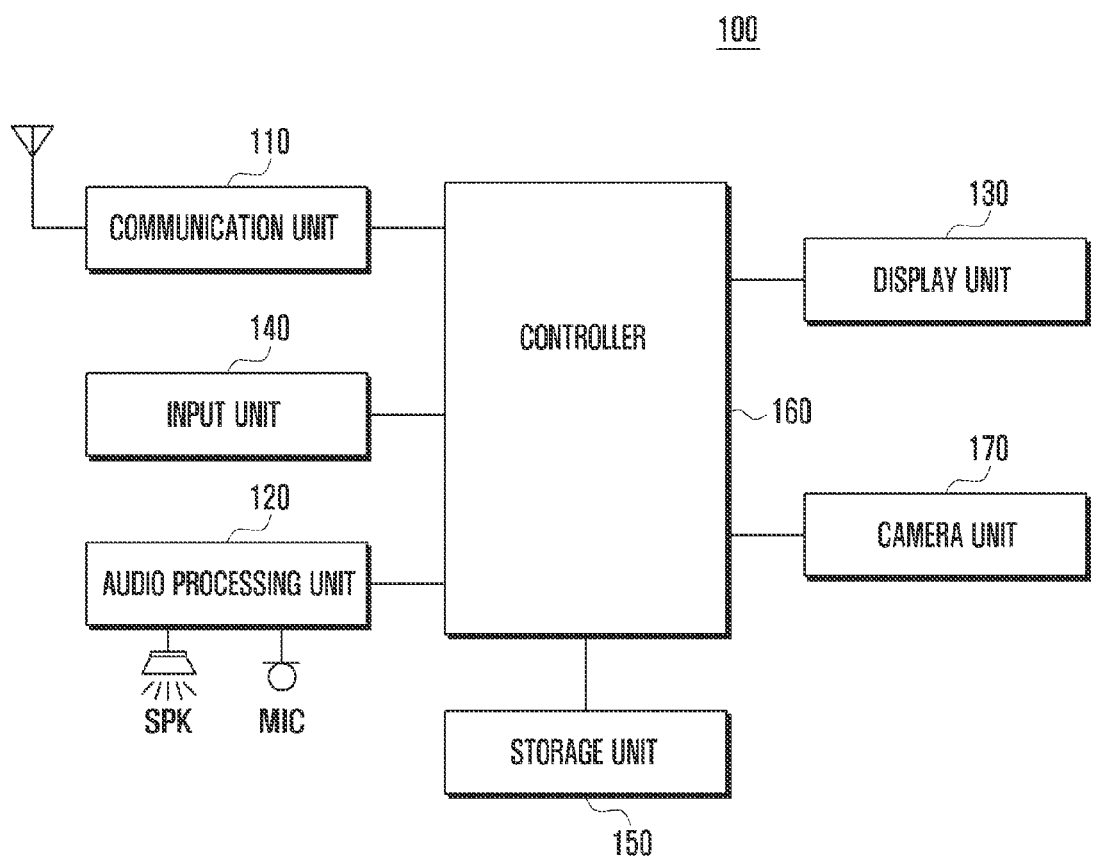
FIG. 1 is a block diagram illustrating an image processing apparatus according to an exemplary embodiment of the present invention.

FIG. 1 is a block diagram illustrating an image processing apparatus according to an exemplary embodiment of the present invention.

Referring to FIG. 1, the image processing apparatus 100 may include a communication unit 110, an audio processing unit 120, a display unit 130, an input unit 140, a storage unit 150, a controller 160, and a camera unit 170. One or more of the above units may be combined as a single unit without departing from the scope of the present invention. For example, the display unit 130 and the input unit 140 may be combined as a touch screen.

The communication unit 110 performs a function of transmitting and receiving corresponding data for wire communication or wireless communication of the image processing apparatus 100. For example, the communication unit 110 may include a Radio Frequency (RF) transmitter for performing frequency up conversion and amplification of a transmission signal, and an RF receiver for performing low noise amplification and frequency down conversion of a received signal. In addition, the communication unit 110 receives data through a wireless channel to be output to the controller 160 and transmits data output from the controller 160 through the wireless channel.

More particularly, the communication unit 110 according to an exemplary embodiment of the present invention may transmit and receive an image including a face or a synthesized image. Also, the communication unit 110 may transmit and receive a voice. The communication unit 110 may transmit the voice to an external voice analysis apparatus, and may receive information of whether a corresponding voice includes a specific phrase or satisfies other preset conditions. Also, the communication unit 110 may transmit an image to an external image analysis apparatus, and may receive information about a location and/or a size of a face portion included in a corresponding image from the image analysis device. Further, the communication unit 110 may receive information of whether a corresponding image satisfies a preset condition, for example, whether specific expression information is found, from the image analysis apparatus. When the controller 160 performs an analysis of the voice or the image instead of relying on the external voice analysis apparatus or image analysis apparatus, part or all of a function of communicating with the external voice analysis apparatus and image analysis apparatus may be omitted from functions of the communication unit 110 described above. Also, when transmission and receiving of the image/voice as in a video call is not necessary, the communication unit 110 may be omitted.

The audio processing unit 120 converts a digital audio signal into an analog audio signal through an audio coder-decoder (codec) to be reproduced through a speaker SPK, and converts an analog audio signal inputted from a microphone MIC into the digital audio signal through the audio codec. The audio processing unit 120 may be configured as a codec, and the codec may be configured as a data codec for processing, for example, packet data, and as the audio codec for processing an audio signal such as a voice. The audio processing unit 120 may be omitted when separate processing of an audio signal is not required.

The display unit 130 visually provides to a user a menu of the voice processing unit 100, input data, function setting information, and a variety of other information. The display unit 130 performs a function to output a booting screen, a standby screen, a menu screen, and other application screens of the voice processing unit 100. According to an exemplary embodiment of the present invention, the display unit 130 may display an image synthesized according to an exemplary embodiment of the present invention described below. In addition, when the voice processing unit 100 supports a video call, the display unit 130 may display an image received from the other party of the video call.

The display unit 130 may be formed in, for example, a Liquid Crystal Display (LCD), an Organic Light Emitting Diode (OLED), or an Active Matrix OLED (AMOLED).

According to an exemplary embodiment of the present invention in which an image is not directly displayed but is instead transmitted to another device, the display unit 130 may be omitted. In this case, another device that receives an image from the image processing apparatus 100 may display a corresponding image.

The input unit 140 may receive a user control input to be transmitted to the controller 160. The input unit 140 may be implemented as a touch sensor and/or a keypad.

The touch sensor, if present, detects a user's touch input. The touch sensor may be configured as a touch detection sensor of, for example, a capacitive overlay type, a resistive overlay type, or an infrared beam type, or configured as a pressure sensor. Other than the above described sensors, all types of sensor devices which can detect a contact or pressure by an object can be used for the touch sensor of the present invention. The touch sensor detects the user's touch input and generates a detection signal to be transmitted to the controller 160. The detection signal includes data of a coordinate at which the user inputs the touch. When the user inputs a touch location movement gesture, the touch sensor generates the detection signal including a coordinate data of a touch location movement path to be transmitted to the controller 160.

The keypad, if present, receives an input signal for controlling the image processing apparatus 100, and generates an input signal to be transmitted to the controller 160. The keypad may include, for example, one or more of a number key and an arrow key, and may be formed on one side of the image processing apparatus 100 as a predetermined function key.

The input unit 140 may include only the touch sensor or the keypad according to an exemplary embodiment of the present invention, or may be omitted when a separate control input is not necessary.

The storage unit 150 may be used to store a program and data used for operating the image processing apparatus 100. The storage unit 150 may be divided into a program area and a data area. The program area, if present, may store one or more of a program for controlling an overall operation of the image processing apparatus 100, an Operating System (OS) for booting the image processing apparatus 100, an application program required to reproduce a multimedia content, and an application program required for another optional function of the image processing apparatus 100 such as, for example, a camera function, a sound reproducing function, or an image or video reproducing function. The data area, if present, is an area in which data generated according to use of the image processing apparatus 100 is stored, and the data area may be used to store, for example, at least one of an image, a video, a phone book, and audio data. More particularly, the storage unit 150 may store an image photographed by the camera unit 170 or an image synthesized by the controller 160.

The camera unit 170 photographs an image. The photographed image is transmitted to the controller 160 or stored in the storage unit 150. A structure for photographing an image is well-known in the related art and thus a detailed description thereof is omitted herein. In an exemplary embodiment of the present invention in which the image is not directly photographed but is instead received from another external device, the camera unit 170 may be omitted.

The controller 160 controls an overall operation of each element of the image processing apparatus 100.

More particularly, referring to FIG. 2 through FIG. 6, the controller 160 may obtain the information about the location and/or the size of the face in a corresponding image from the image, and synthesize an image accordingly. Also, the controller 160 may determine whether an image or a voice satisfies a specific preset condition, and synthesize an image accordingly. A detailed description of the above will be made with reference to FIG. 2 through FIG. 6.

Figure 2:
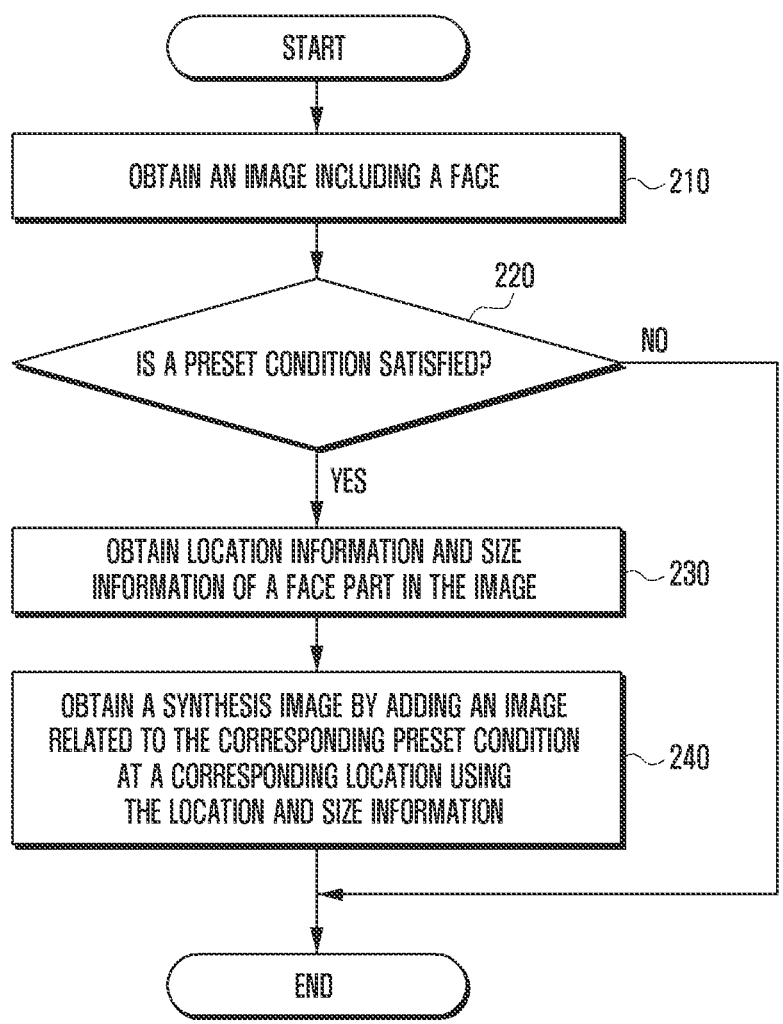
FIG. 2 is a flowchart illustrating an image processing process according to a first exemplary embodiment of the present invention.

FIG. 2 is a flowchart illustrating an image processing process according to a first exemplary embodiment of the present invention.

Referring now to FIG. 2, the controller 160 of the image processing apparatus 100 obtains the image including the face at step 210. For example, the camera unit 170 of the image processing apparatus 100 may photograph the image so that the controller 160 may obtain the image. Also, the communication unit 110 may receive the image from the other party of the video call so that the controller 160 may obtain the image. An image obtained in the above described method or other methods may be utilized in the following manner.

Next, the controller 160 determines whether the preset condition is satisfied at step 220. For example, the controller 160 may determine whether the preset condition is met by analyzing the image. Also, the controller 160 may obtain a voice with the image and determine whether a corresponding voice satisfies the preset condition. Further, whether the preset condition is met may be determined by analyzing both the image and the voice. According to another example, the controller 160 may transmit at least one of the obtained image and voice to an external analysis device and, by using a received analysis result, the controller 160 may determine whether the preset condition is met. A detailed description of determining whether a specific preset condition is met will be made with reference to FIG. 3 through FIG. 6.

If the corresponding preset condition is not satisfied, the process is terminated.

If the corresponding preset condition is satisfied, the process proceeds to step 230.

The controller 160 obtains the information about the location and the size of the face portion in the image at step 230. For example, the controller 160 may obtain information of a location and a size of an eye and/or a mouth of the face. For another example, the controller 160 may directly analyze the image to obtain location information and size information of the face portion. According to another exemplary embodiment of the present invention, the controller 160 may transmit the image to the external image analysis device of the image processing apparatus 100 and receives an analysis result from the image analysis device to obtain the location information and the size information of the face portion. A technology of recognizing at least one of a location and size of the eye and the nose of the face in the image is well known in the related art, and thus a detailed description thereof will be omitted.

Here, the location information may be, for example, a center of gravity of a corresponding face portion or a vertex of a rectangle having a minimum size to include the corresponding face portion. Also, the size information may include height information, width information, information of a diameter or radius, or information of a length of a diagonal line. The size information may be expressed in a form of information of a location of vertices facing each other of the rectangle having the minimum size to include the corresponding face portion. Other various methods may be used to represent the location and size information, with only a difference in expression, and essentially any information which can represent the location and size information may be the location and size information.

The controller 160 adds and synthesizes an image (including a moving image) which corresponds to the preset condition satisfied in step 220 with a corresponding image by using the location information and the size information at step 240. For example, if a phrase "happy" is found in the voice, a smiling image which corresponds to a preset condition for finding the corresponding phrase may be added and synthesized at locations of the eye and the mouth of the image to produce an image of the face smiling. Here, according to the size information of the eye and the mouth, a size of the smiling image may be adjusted. According to an exemplary embodiment of the present invention, the obtaining and using of the size information of the face portion may be omitted. The controller 160 may add and synthesize the smiling image of a predefined size.

Figure 3:
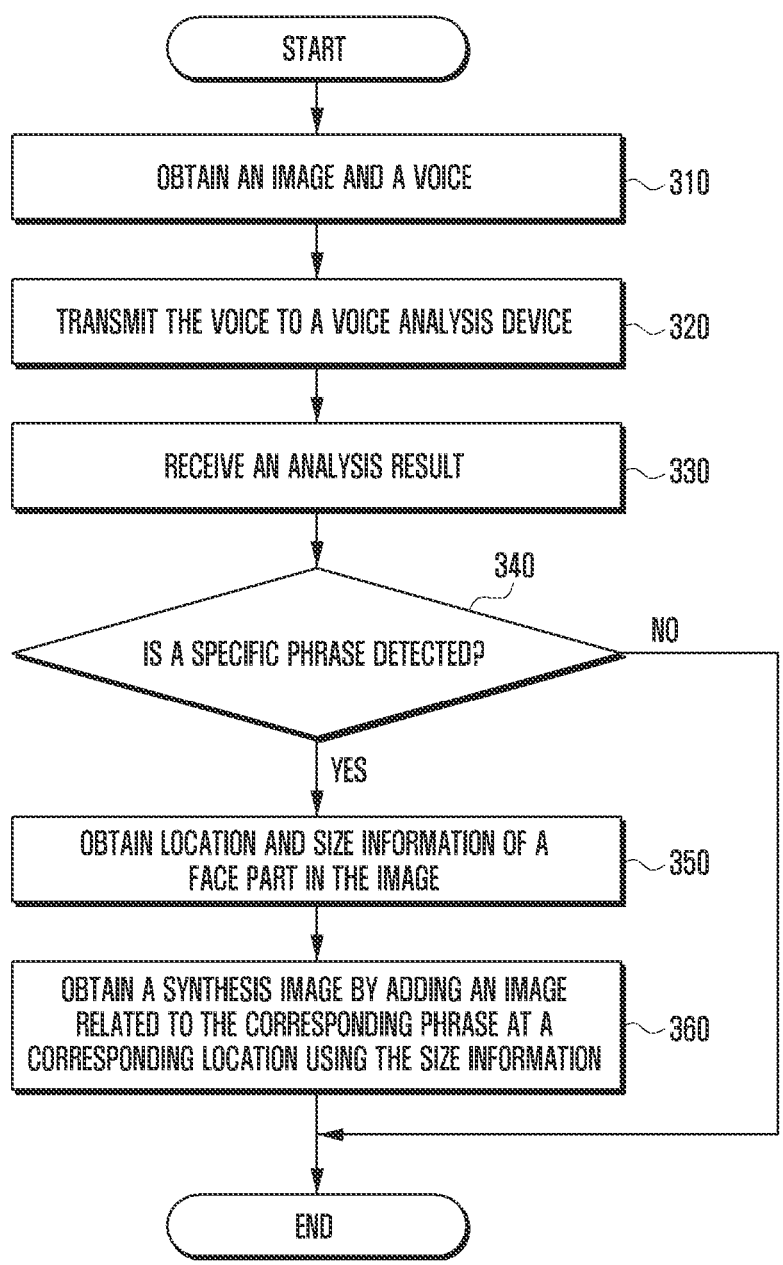
FIG. 3 is a flowchart illustrating an image processing process according to a second exemplary embodiment of the present invention.

FIG. 3 is a flowchart illustrating an image processing process according to a second exemplary embodiment of the present invention.

Figure 4:
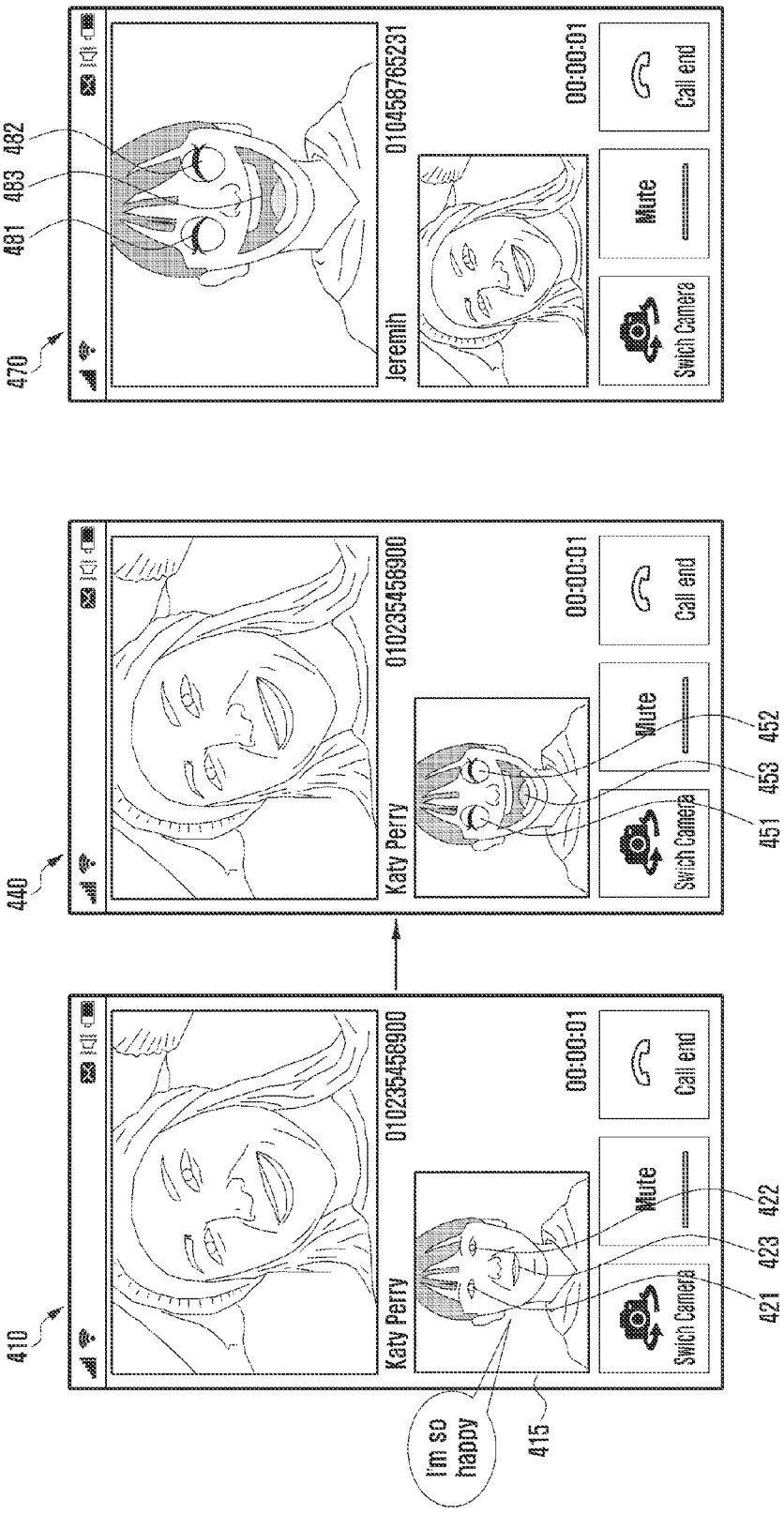
FIG. 4 is a view illustrating an image synthesis in the image processing process according to the second exemplary embodiment of the present invention.

FIG. 4 is a view illustrating an image synthesis in the image processing process according to the second exemplary embodiment of the present invention.

Referring now to FIGS. 3 and 4, the controller 160 of the image processing apparatus 100 obtains the image and the voice at step 310. For example, the controller 160 may obtain a user's photographed image and voice through the camera unit 170 and the audio processing unit 120. In another example, the controller 160 may obtain the image and the voice from another device through the communication unit 110. As shown in FIG. 4, the image processing apparatus 100 obtains an image 415 as shown in a first screen 410. It is assumed that the image 415 is photographed through the camera unit 170 of the image processing apparatus 100. However, it should be noted that the present invention is not limited thereto, and an image obtained by other method may be processed likewise.

The controller 160 transmits the voice obtained through the communication unit 110 to the external voice analysis device of the image processing apparatus 100 at step 320. The controller 160 receives the analysis result of the corresponding voice from the external voice analysis device through the communication unit 110 at step 330. The voice analysis device, for example, analyzes the voice and notifies the image processing apparatus 100 if a preset phrase is found. A technology of analyzing the voice to find a specific phrase is well known in the related art, and thus a detailed description thereof will be omitted. Any voice analyzing technology of corresponding capability may be utilized.

The controller 160 determines whether the preset phrase is found in the corresponding voice at step 340. For example, assume that the image processing apparatus 100 synthesizes an image of a smiling face in a case where the phrase "happy" is found. If the user says, "I'm so happy," to the image processing apparatus 100 through the microphone MIC, the controller 160 may find the phrase "happy." The preset phrase may be set by the user or by at least one of a service provider, a terminal producer, and a software provider.

According to an exemplary embodiment of the present invention, an image synthesis is performed according to whether the specific phrase is found through the voice analysis. However, the present invention is not limited thereto. For example, according to a modified example, whether a specific image is to be synthesized with the image may be determined by using one or more of a tone, a pitch, and a loudness of the voice. Also, in an exemplary embodiment of the present invention, merging a specific image on video by using one of tone, pitch, loudness of voice can be determined. Also, in an exemplary embodiment of the present invention, when the specific image is found, it is determined whether to synthesize the specific image with the image by considering at least one of the tone, the pitch, and the loudness of the voice of the corresponding phrase, is possible. Here, it is assumed that only whether the specific phrase is found is considered.

If the specific phrase is not found, the process is terminated.

If the specific phrase is found, the process proceeds to step 350.

The controller 160 obtains the location information and the size information of the face part in the image at step 350. Referring to FIG. 4, locations 421 and 422 of two eyes and a location 423 of the mouth are displayed. The controller 160 adds and synthesizes an image which corresponds to the phrase found in step 340 with the corresponding image by using the location information and the size information at step 360. It is assumed that an image which corresponds to the phrase "happy" is images 451, 452, and 453 of a second screen 440. The images 451, 452, and 453 are respectively synthesized with the locations 421, 422, and 423 of the eyes and the mouth. Additionally, sizes of the images 451, 452, and 453 may be adjusted according to sizes of the eyes and the mouth. For example, a width of the eye image 451 may be adjusted to be double a length from a left end to a right end of the eye 421.

For another example, the size of the image 451 may be adjusted while maintaining a ratio of a left-to-right length to a top-to-bottom height. Thus, the left-to-right length of the image 451 may be determined regardless of a top-to-bottom height of the eye, and the top-to-bottom height of the image 451 may be determined in proportion thereto. On the other hand, the size of the image 451 may be adjusted while not maintaining the ratio of the left-to-right length and the top-to-bottom height. For another example, with respect to an eye having a thin and wide eye, the image 451 may be modified to be likewise in a relatively thin and wide shape to be synthesized.

The image synthesized in the above manner may be displayed on the display unit 130 as shown in the second screen 440. Also, the synthesized image may be transmitted to the other party of the video call. The other party of the video call may be provided with an image including the user's face in which images 481, 482, and 483 as shown in a third screen 470 are synthesized. According to another exemplary embodiment of the present invention, the synthesized image may be saved in the storage unit 150 temporarily or semi-permanently. The image saved in the storage unit 150 may be reproduced later or utilized for additional processing. The synthesized image may be, for example, used for a Social Network Service (SNS) or posted on a web page through a copyright tool or other application.

In the above described example, if the specified phrase is found, the image synthesis may apply to a part of the image corresponding to a time point at which the specific phrase is found. For example, when the phrase "happy" is found in the voice at 2:00 minute of a total length, the image of the smiling face may be synthesized with an image corresponding to 2:00 to 2:03 minutes. However, a start/end point of applying the synthesis may be variously modified according to an exemplary embodiment of the present invention.

A plurality of phrases other than the above mentioned phrase may be set up beforehand, and different images may be assigned to respective phrases. For example, a crying image may be assigned to a phrase "sad." Thus, images corresponding to any of various emotions, statements, words, or phrases may be assigned.

Figure 5:
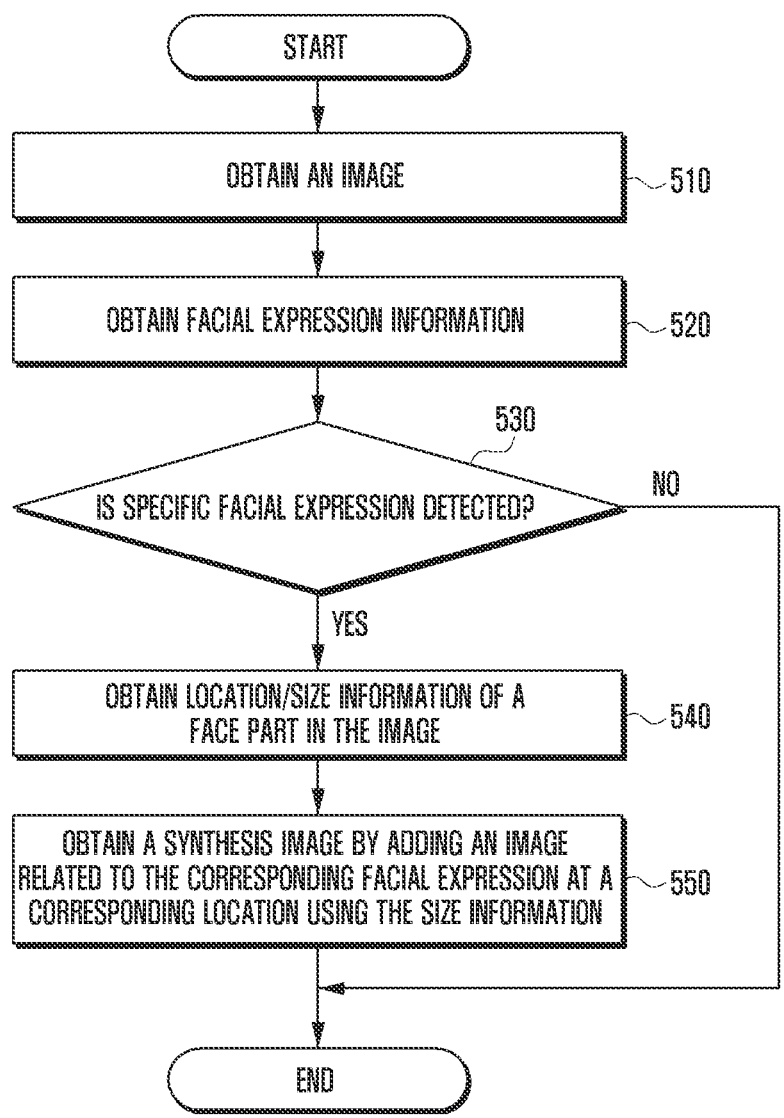
FIG. 5 is a flowchart illustrating of an image processing process according to a third exemplary embodiment of the present invention.

FIG. 5 is a flow chart illustrating of an image processing process according to a third exemplary embodiment of the present invention.

Figure 6:
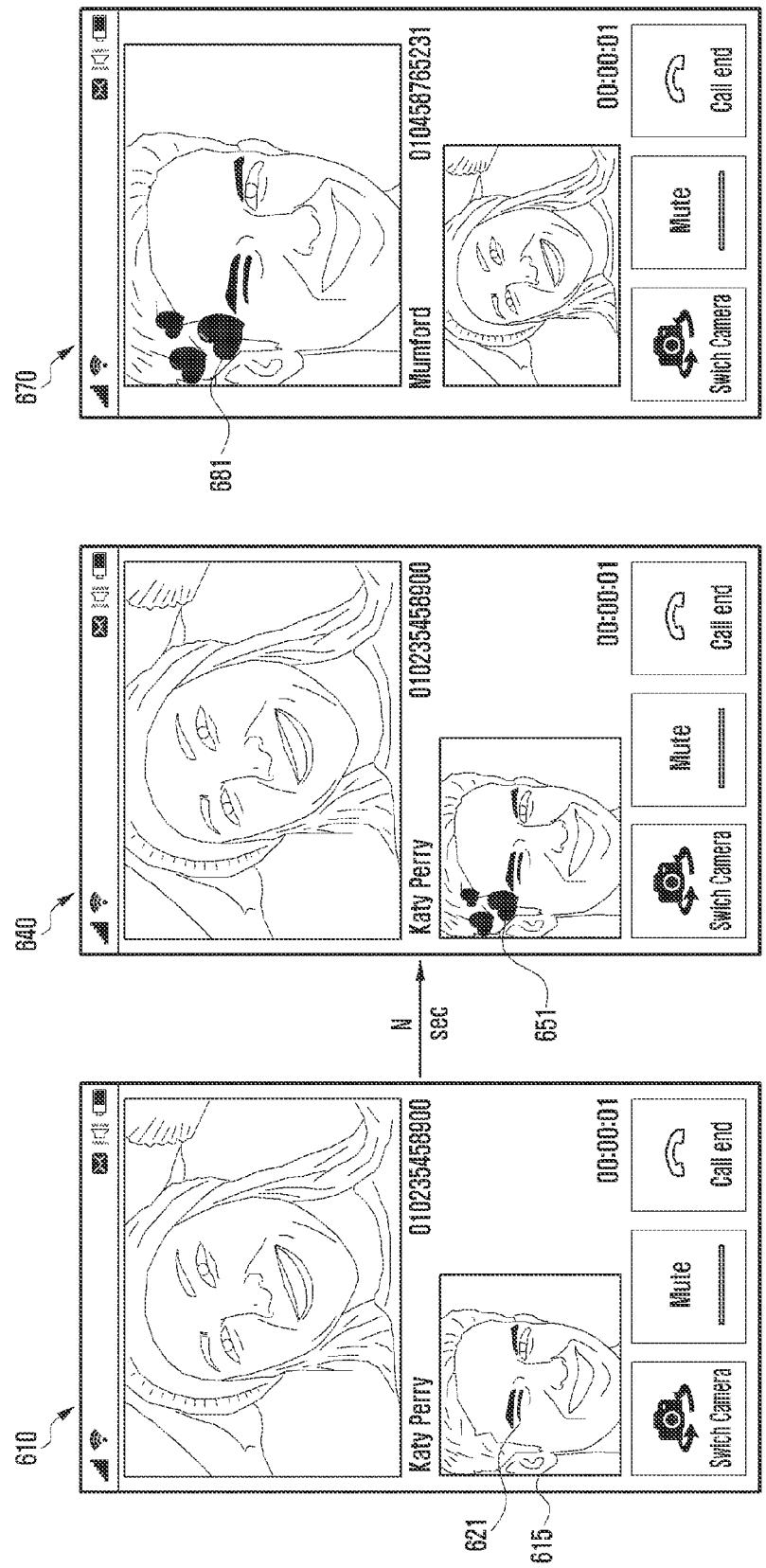
FIG. 6 is a view illustrating of an image synthesis according to the third exemplary embodiment of the present invention.

FIG. 6 is a view illustrating of an image synthesis according to the third exemplary embodiment of the present invention.

Referring now to FIGS. 5 and 6, the controller 160 obtains the image at step 510. Similar to the exemplary embodiments described above, the controller 160 may obtain the image through at least one of the camera unit 170 and the communication unit 110. The controller 160 obtains facial expression information at step 520. The image processing apparatus 100 may obtain the facial expression information by comparing a preset image pattern with a face part of the image. For example, when similarity is determined, having a value higher than a preset value as a result of comparing a preset image pattern of the smiling face with the image, the face in the image may be determined as the smiling face. In this case, the controller 160 may obtain facial expression information corresponding to the smiling face. An image pattern is a pattern which represents a characteristic part of a facial expression such as smiling. For example, the smiling face may have a characteristic that an eye becomes thinner and a dimple appears, so the image pattern may be formed to determine such a characteristic. In a case of a kissing motion, the kissing motion may be detected by using an image pattern for determining a characteristic of lips puckering up and spreading. When it can be determined that, as a result of a comparison with the image of a corresponding part, the dimple appears and the eye becomes thinner, the smiling face may thus be recognized. Any other technologies of corresponding capability for recognizing facial expressions may be utilized.

The controller 160 may detect the facial expression by directly analyzing the image, or may detect the facial expression using the external image analysis device of the image processing apparatus 100.

A winking face 615 is shown on the first screen 610 of FIG. 6.

The controller 160 determines whether a specific facial expression is detected at step 530. In other words, the controller 160 determines whether facial expression information of the winking face, or similarity having a value higher than a preset value, is detected when an image pattern corresponding to the winking face is compared with the image. When preset facial expression such as a wink is detected as shown in the first screen 610 of FIG. 6, the process proceeds to step 540. On the other hand, when the specific facial expression is not detected, the process is terminated. In order to avoid error, synthesis following step 540 may be configured to be performed only when detection of the specific facial expression continues for a preset time interval, for example, 2 seconds.

The controller 160 obtains the location and size information of the face part in the image at step 540. A detailed method of obtaining the location and size information has already been described with reference to FIG. 2 through FIG. 4. An example is assumed to display at least one heart image 651 around a tail of the eye, that is, an outermost point of the eye fold, corresponding to the winking face. The controller 160 obtains information of a location 621 of the tail of a winking eye and size information of the eye in the image 615 in the first screen 610 of FIG. 6.

The controller 160 adjusts and displays an image corresponding to the detected facial expression at a corresponding location according to a size of the eye at step 550. Similar to the exemplary embodiments of FIG. 2 through FIG. 4, obtaining and using the size information may be omitted. Referring to the second screen 640 of FIG. 6, at least one heart image 651 may be synthesized with the location 621 of the tail of the eye according to the winking face and displayed.

The image synthesized in the above manner may be displayed on the display unit 130 of the image processing apparatus 100 as shown in the second screen 640. Also, the synthesized image may be transmitted to the other party of the video call. The other party of the video call may be provided with an image including the other party's face in which an image 681 shown in a third screen 670 is synthesized. According to another exemplary embodiment, the synthesized image may be saved in the storage unit 150 temporarily or semi-permanently. The image saved in the storage unit 150 may be reproduced later or utilized for additional processing. The synthesized image may be used for the SNS or posted on a web page through the copyright tool or other application.

Here, it should be understood that each block of the flow-charts and a combination of the blocks of the flowcharts may be carried out by computer program instructions. Because these computer program instructions can be loaded in non-transitory storage on a general-purpose computer, a special purpose computer, or a processor of data processing equipment, these instructions carried out by a computer or a processor of the data processing equipment may generate means for performing functions described in connection with the block(s) of the flowcharts. These computer program instructions can be stored in a computer or a non-transitory memory usable or readable by the computer, which can be used for programmable data processing equipment, in order to implement a function in a specific way, and thus, it is possible to produce the instructions stored in the computer usable or readable memory into a manufactured item that contains instruction means for performing the function described in connection with the block(s) in the flow. Because computer program instructions can be loaded on the computer or other programmable data processing equipment, computer program instructions which perform on the computer or other programmable data processing equipment can provide steps for performing the described functions described with connection to the block(s) in the flow charts by generating a process, executed by the computer, in which a series of steps are carried out by the computer or the other programmable data processing equipment.

Also, each block may illustrate a part of a module, a segment, or code including one or more executable instructions for performing at least one specific logical function. Additionally, in several alternative exemplary embodiments, functions described with connection to the blocks may be performed in a different order. For example, two blocks shown in a row may be performed substantially concurrently, or the blocks may be performed in a different order according to a corresponding function.

Also, the term 'unit' used in the exemplary embodiments herein includes a combination of hardware and software elements or a hardware element such as a Field Programmable Gate Array (FPGA) or Application-Specific Integrated Circuit (ASIC), and the 'unit' performs certain functions. However, the 'unit' is not limited to the combination of hardware and software or hardware. The 'unit' may be configured to be embodied within a non-transitory storage medium that can be addressed and configured to be reproduced by one or more processors. Accordingly, for example, the 'unit' may include elements such as software elements, object oriented software elements, class elements, and task elements, as well as processes, functions, properties, procedures, sub-routines, segments of program codes, drivers, firmware, microcodes, circuits, data, a database, data structures, tables, arrays, and variables that are executed and/or processed by at least one processor. Functions provided by the elements and the 'units' can be combined into a smaller number of elements and 'unit's, or divided into additional elements and 'units.' Also, the elements can be embodied to run one or more Central Processing Units (CPUs) within a device or a security multimedia card.

According to an exemplary embodiment of the present invention, an effect of providing a method and an apparatus for image processing capable of synthesizing an image in harmony with a face within the image and providing the synthesized image may be achieved.

Also, according to an exemplary embodiment of the present invention, an effect of providing a method and an apparatus for image processing capable of synthesizing an image with an appropriate image without losing a flow of conversation and providing the synthesized image may be achieved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of processing an image by an image processing apparatus, the method comprising:
obtaining first image data including a face;
obtaining voice data;
determining whether the voice data satisfies a preset condition after the first image data is obtained;
obtaining location information of a face part within the first image data when the voice data satisfies the preset condition;
generating synthesized image data by adding second image data corresponding to the satisfied condition to the first image data at a location of the face part; and
displaying the synthesized image data.

2. The method of claim 1, further comprising:
obtaining size information of the face part with respect to the first image data when the voice data satisfies the preset condition,
wherein the generating of the synthesized image data comprises generating the synthesized image data by adding the second image data corresponding to the satisfied condition to the first image data at the location of the face part, by using the size information of the face part.

3. The method of claim 1, wherein the determining of whether the voice data satisfies the preset condition comprises obtaining information of whether a word or phrase which satisfies the preset condition is extracted from the voice data.

4. The method of claim 3, wherein the synthesized image data comprises a facial expression corresponding to the word or phrase.

5. The method of claim 1, wherein the determining of whether the voice data satisfies the preset condition comprises:
   transmitting the voice data to a voice analysis device; and
   obtaining information of whether a phrase which satisfies the preset condition is extracted from the voice data by the voice analysis device.

6. The method of claim 1, further comprising:
   determining similarity between the first image data and a preset image pattern; and
   generating synthesized image data by adding a third image data corresponding to the preset image pattern to the first image data at a location of the face part when the similarity between the first image data and the preset image pattern is greater than a preset value.

7. The method of claim 6, wherein the preset image pattern comprises a facial expression.

8. The method of claim 1, wherein the face part comprises at least one of an eye, a mouth, a nose, an eyebrow, a chin, and a cheek.

9. The method of claim 1, wherein the second image data corresponding to the satisfied condition comprises at least one element of a facial expression.

10. An apparatus for processing an image, the apparatus comprising:
    a camera unit;
    an audio processing unit;
    a display unit; and
    a controller configured to:
       obtain first image data including a face from the camera unit,
       obtain voice data from the audio processing unit,
       determine whether the voice data satisfies a preset condition after the first image data is obtained,
       obtain location information of a face part within the first image data when the voice data satisfies the preset condition,
       generate synthesized image data by adding second image data corresponding to the satisfied condition to the first image data at a location of the face part, and
       display the synthesized image data on the display unit.

11. The apparatus of claim 10, wherein the controller is configured to obtain size information of the face part with respect to the first image data when the voice data satisfies the preset condition and configured to generate the synthesized image data by adding the second image data corresponding to the satisfied condition to the first image data at the location of the face part, by using the size information of the face part.

12. The apparatus of claim 10, wherein the controller is configured to obtain information of whether a word or phrase which satisfies the preset condition is extracted from the voice data.

13. The apparatus of claim 12, wherein the synthesized image data comprises a facial expression corresponding to the word or phrase.

14. The apparatus of claim 10, further comprising:
    a communication unit configured to transmit the voice data to a voice analysis device and configured to receive information of whether a phrase which satisfies the preset condition is extracted from the voice data by the voice analysis device.

15. The apparatus of claim 10, wherein the controller is configured to determine similarity between the first image data and a preset image pattern and configured to generate a synthesized image data by adding a third image data corresponding to the preset image pattern to the first image data at a location of the face part when the similarity between the first image data and the preset image pattern is greater than a preset value.

16. The apparatus of claim 15, wherein the preset image pattern comprises a facial expression.

17. The apparatus of claim 10, wherein the face part comprises at least one of an eye, a mouth, a nose, an eyebrow, a chin, and a cheek.

18. The apparatus of claim 10, wherein the second image data corresponding to the satisfied condition comprises at least one element of a facial expression.

19. A non-transitory storage medium including execution codes readable by a computer to implement an image processing method, the image processing method comprising:
    obtaining first image data including a face;
    obtaining voice data;
    determining whether the voice data satisfies a preset condition after the first image data is obtained;
    obtaining location information of a face part within the first image data when the voice data satisfies the preset condition;
    generating synthesized image data by adding second image data corresponding to the satisfied condition to the first image data at a location of the face part; and
    displaying the synthesized image data.

* * * * *